S. BORTON, DEC'D.
C. P. BORTON, ADMINISTRATRIX.
SEWING MACHINE.
APPLICATION FILED JUNE 18, 1907.
1,041,584.
Patented Oct. 15, 1912.
7 SHEETS—SHEET 1.
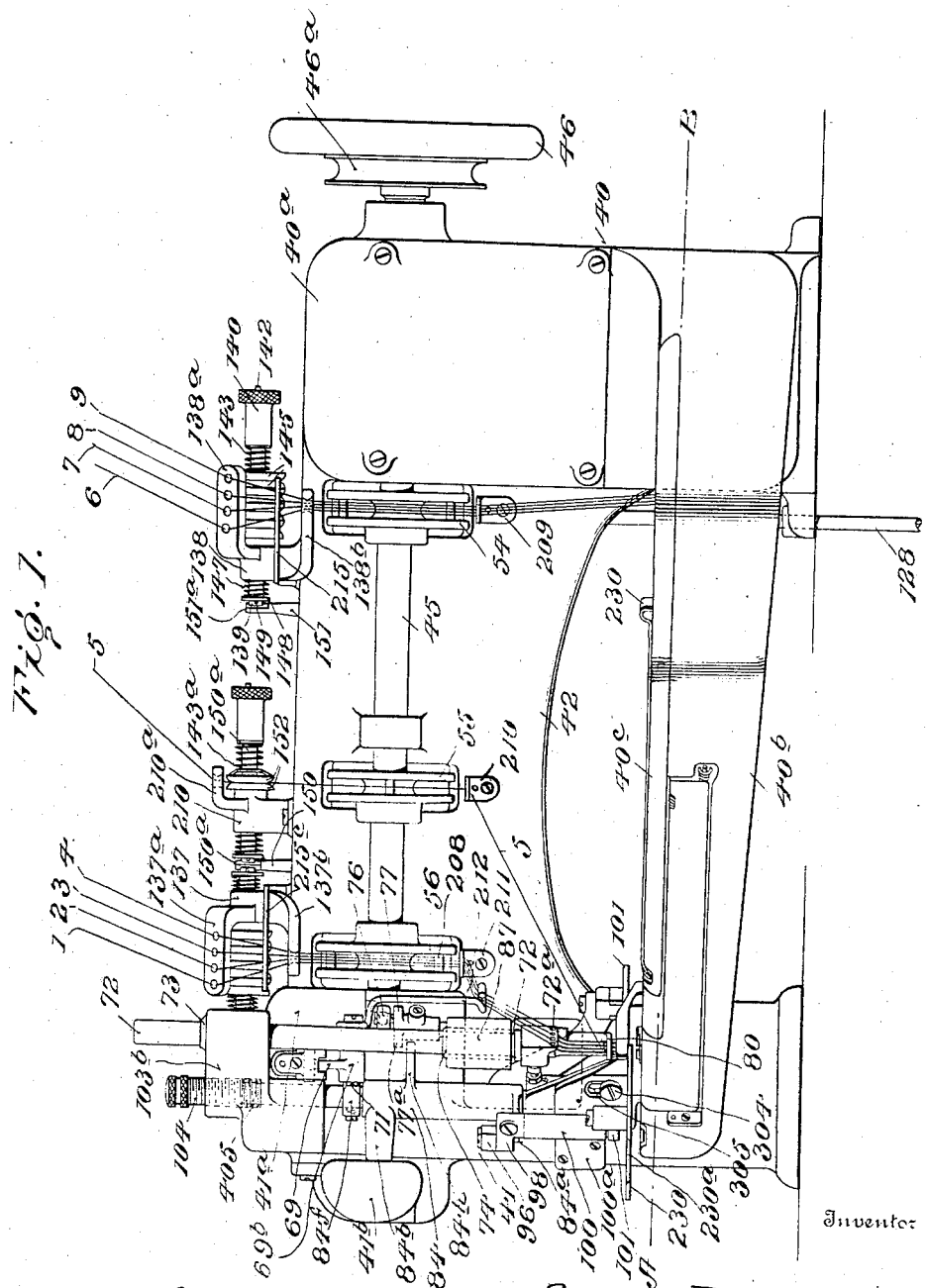

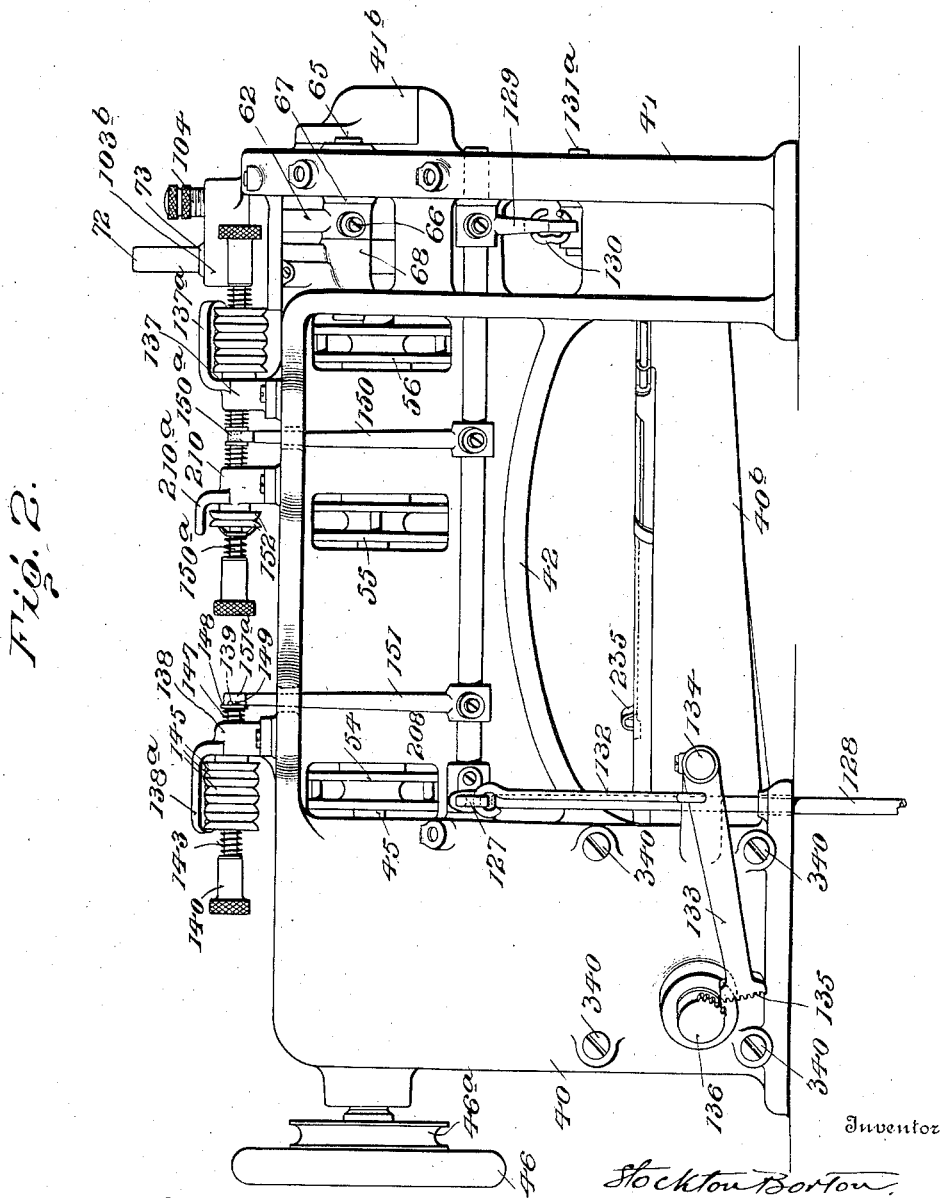

S. BORTON, DEC'D.
C. P. BORTON, ADMINISTRATRIX.
SEWING MACHINE.
APPLICATION FILED JUNE 18, 1907.
1,041,584.
Patented Oct. 15, 1912.
7 SHEETS—SHEET 3.
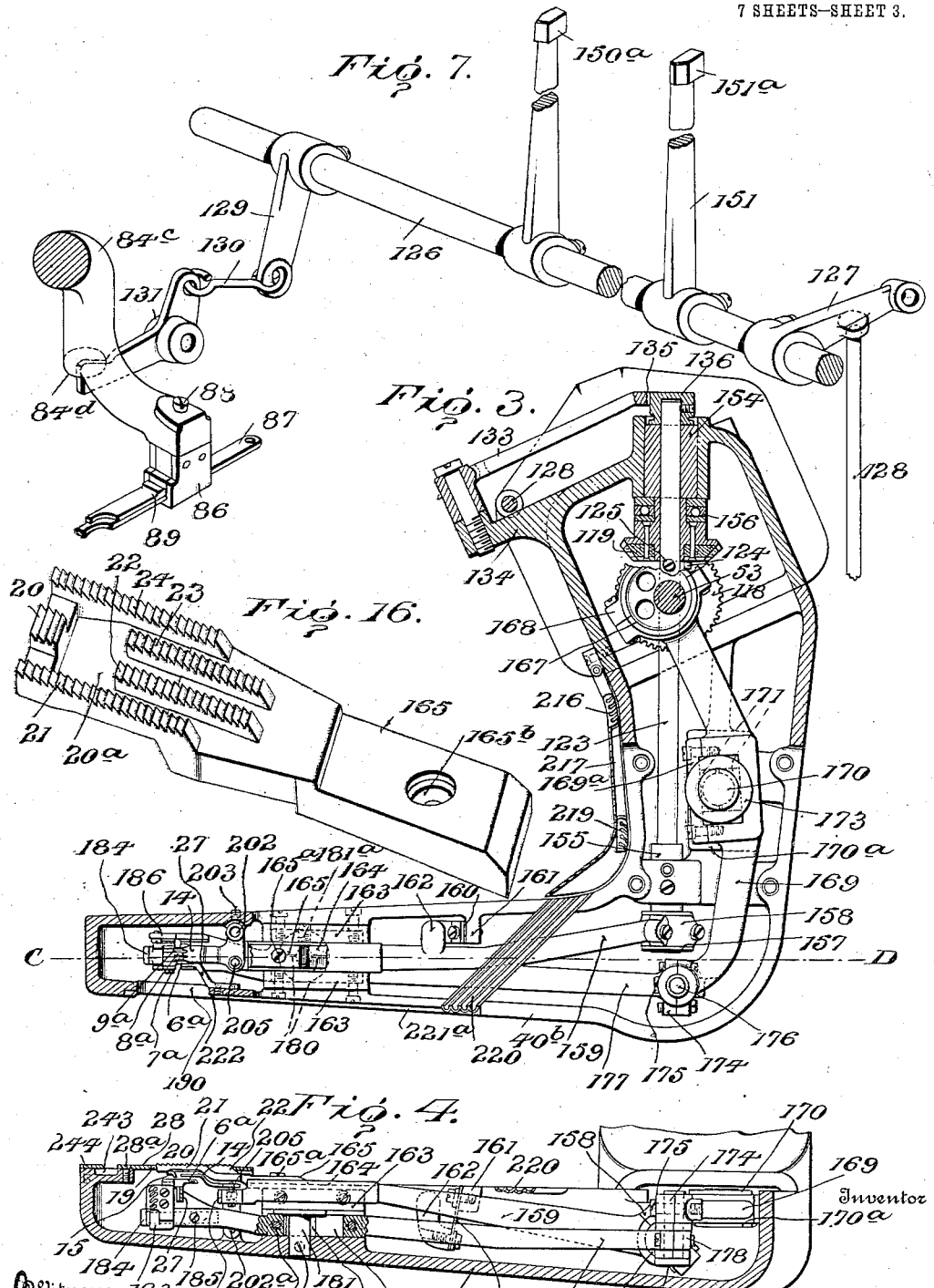

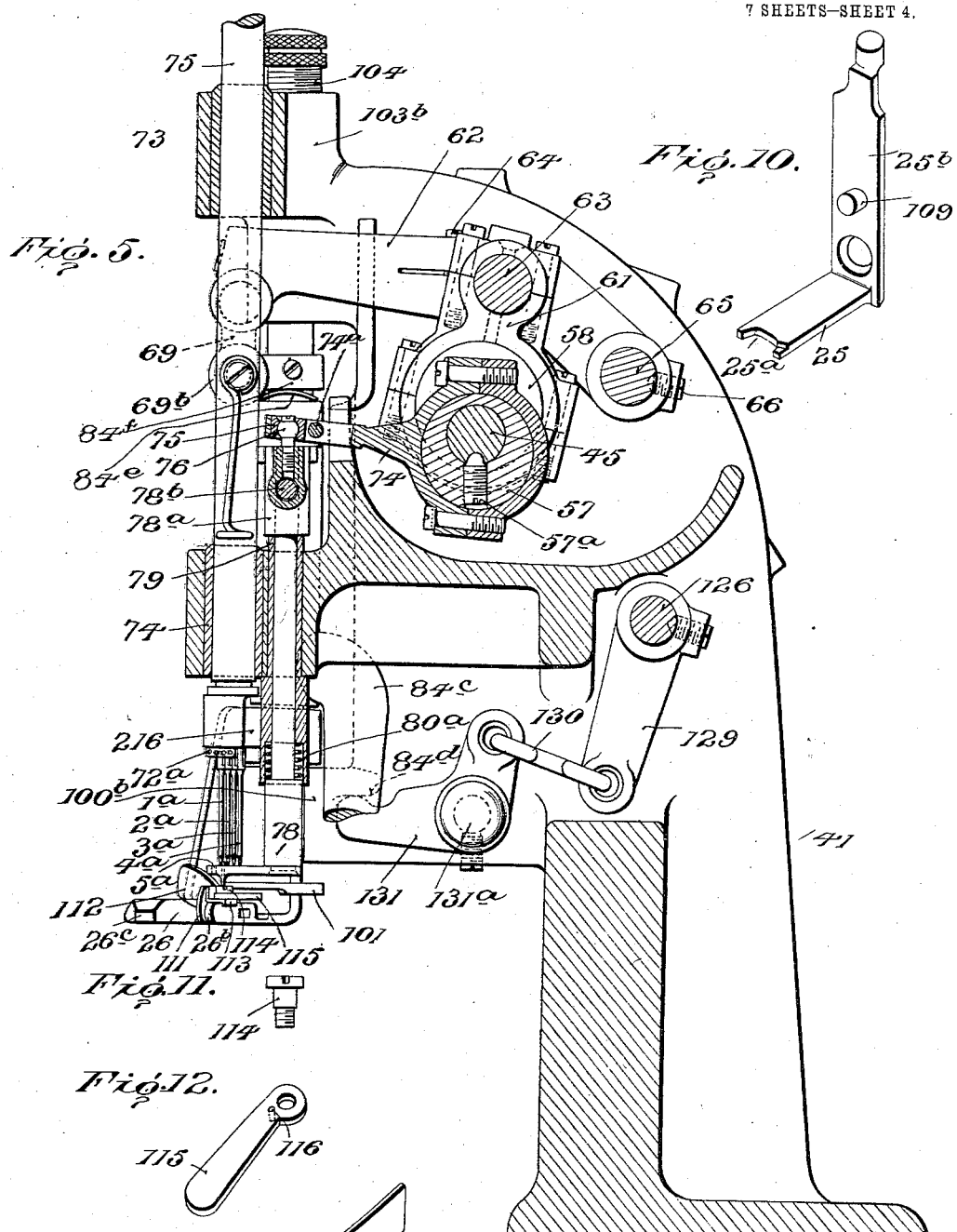

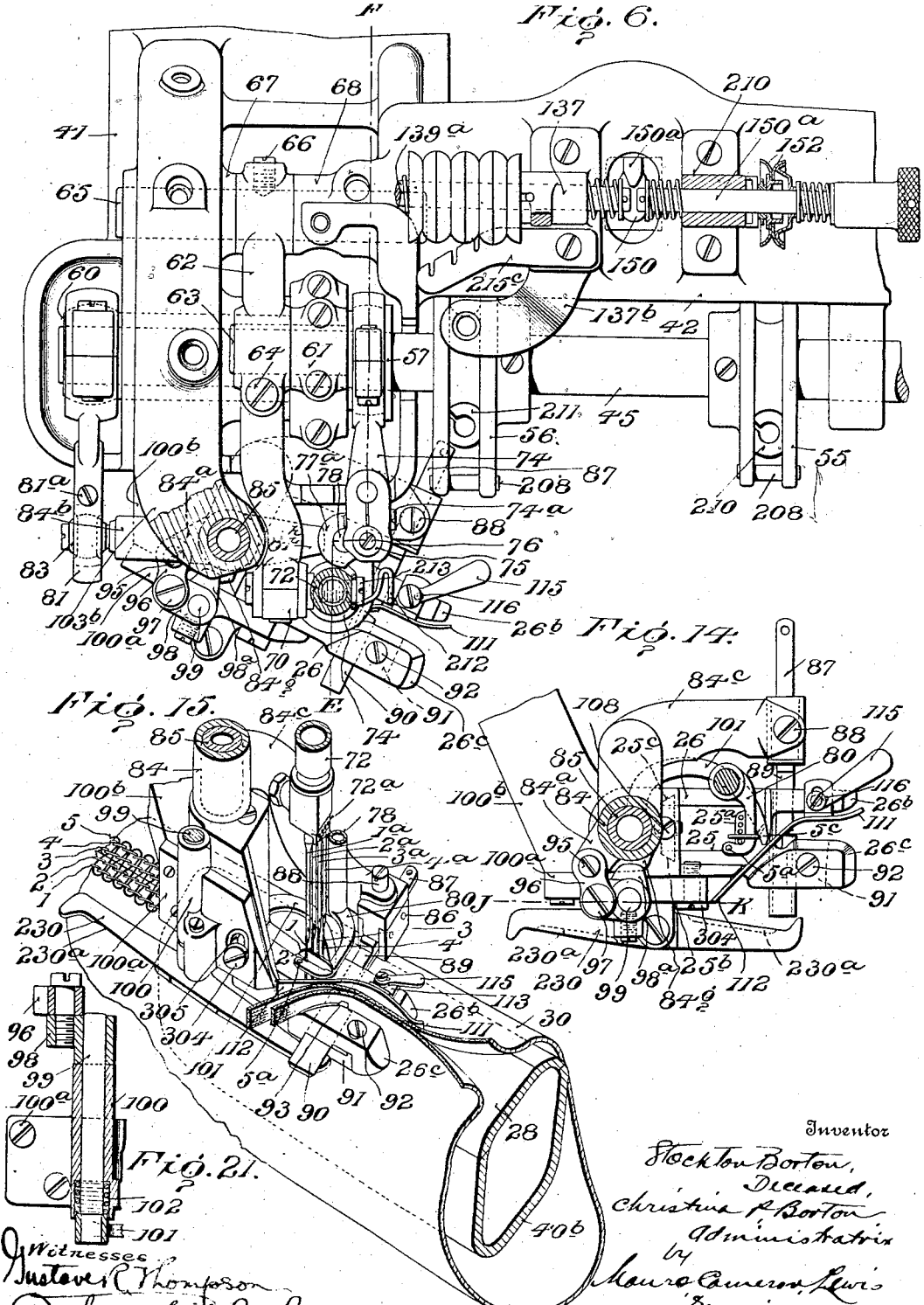

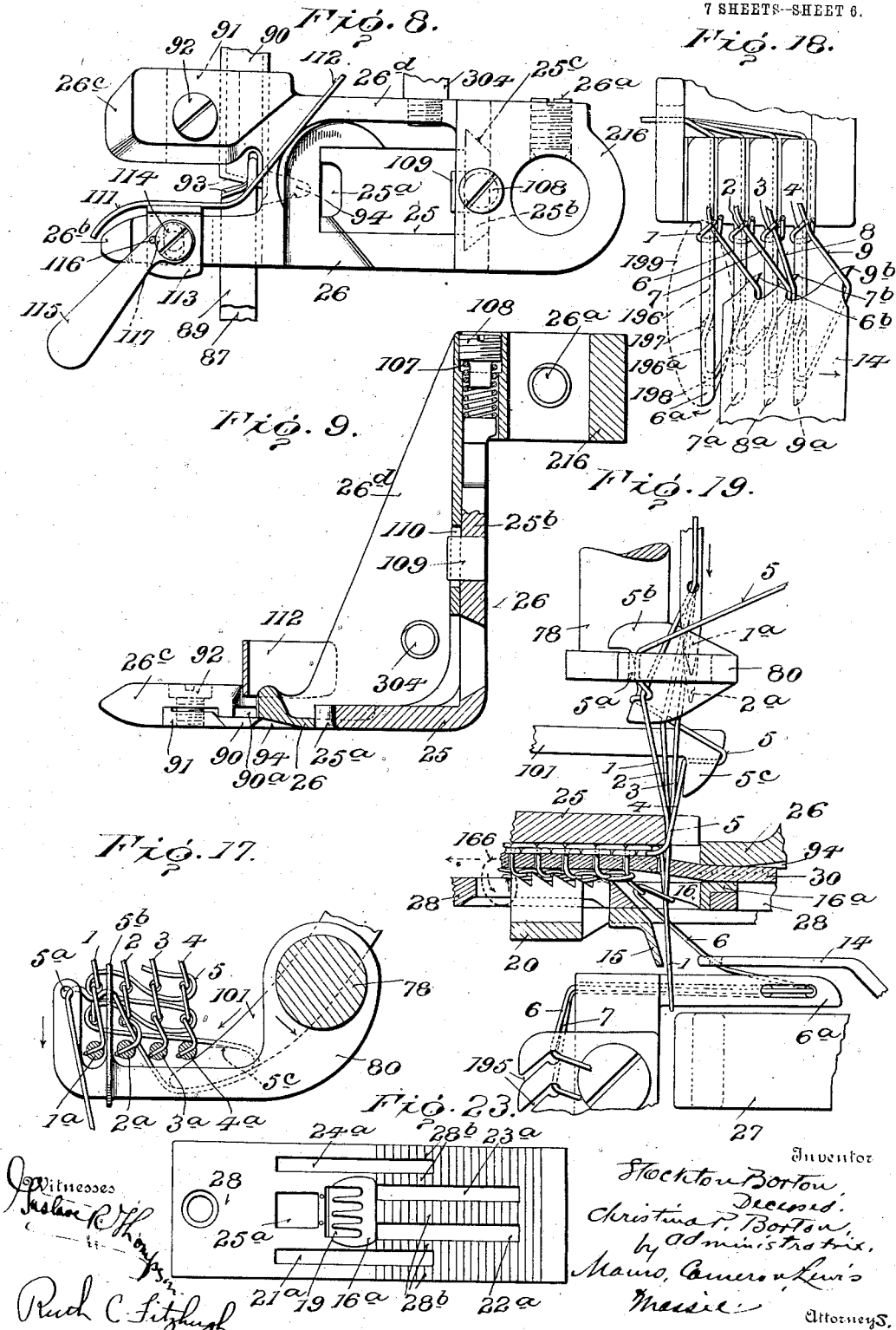

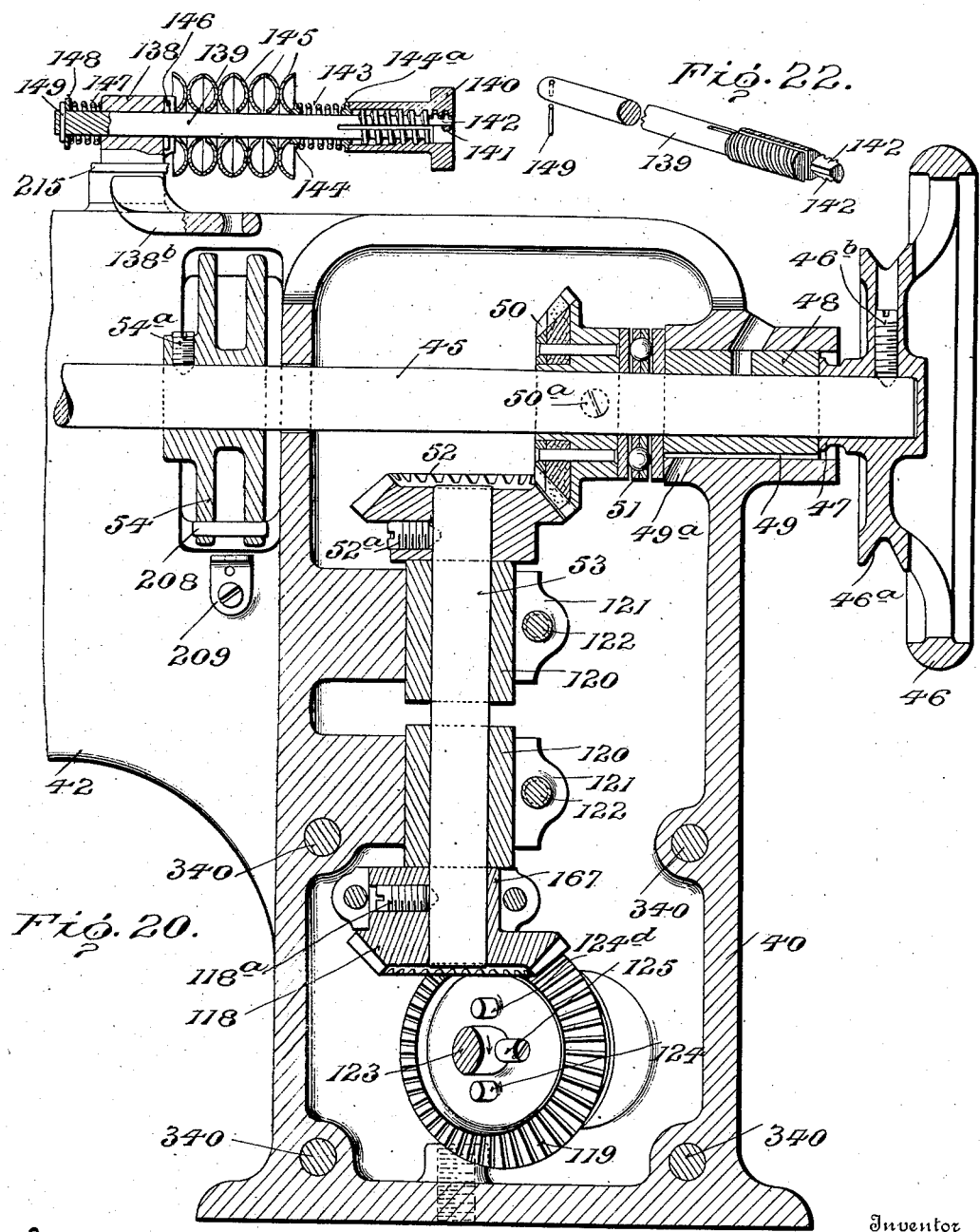

UNITED STATES PATENT OFFICE.

CHRISTINA P. BORTON, OF WARWICK, RHODE ISLAND, ADMINISTRATRIX OF STOCKTON BORTON, DECEASED, ASSIGNOR TO WILLCOX & GIBBS SEWING MACHINE COMPANY, OF NEW YORK, N. Y., A CORPORATION OF NEW YORK.

SEWING-MACHINE.

1,041,584. Specification of Letters Patent. Patented Oct. 15, 1912.

Original application filed December 13, 1906, Serial No. 347,649. Divided and this application filed June 18, 1907. Serial No. 379,653.

*To all whom it may concern:*

Be it known that STOCKTON BORTON, deceased, late a citizen of the United States, and resident of the town of Warwick, county of Kent, State of Rhode Island, did invent new and useful Improvements in Sewing-Machines, fully set forth in the following specification.

The present invention relates to a sewing-machine especially designed to produce, by one operation and at high speed (meaning that each needle shall be capable of making approximately three thousand or more stitches per minute), a complete seam of special form for joining two abutting edges of cut-knit goods.

This is a division of my application for United States Letters-Patent filed Dec. 13, 1906, Sr. No. 347,649.

The present invention is particularly directed to improvements in the presser-foot, especially to the combination with a main presser-foot of an auxiliary or "chaining-foot;" means under control of an operative for moving the pressure-foot, and other elements of the mechanism operating above the throat-plate, from their normal operative positions, relatively near the throat-plate, to positions more distant from the throat-plate to permit introduction or withdrawal of work; means for releasing the thread-tensioning devices simultaneous with said movement of the presser-foot and other elements; means, other than the driving connections, and under control of an operative, for moving the feed-surface out of position for engagement with the work when the machine is stopped with said feed-surface in engagement with the work; and to other features of improvement and combinations of elements hereinafter fully explained and set forth in the claims.

Figure 1 is a front elevation, and Fig. 2 a rear elevation of the complete machine; Fig. 3 is a horizontal section on line A—B, Fig. 1; Fig. 4 is a vertical section on line C—D, Fig. 3; Fig. 5 is a vertical section, with the work-arm omitted, on line E—F, Fig. 6; Fig. 6 is a top plan view of the left-hand end of the machine, with the work-arm omitted and casing-caps removed; Fig. 7 (Sheet 3), shows in perspective a part of the connections for lifting parts of the mechanism which operate above the throat-plate; Fig. 8 (Sheet 6) is a top plan view, and Fig. 9 is a vertical sectional view of the presser-foot; Fig. 10 (Sheet 4) shows a part (the auxiliary foot) of the presser-foot; Figs. 11, 12 and 13 (Sheet 4) show other parts of the presser-foot; Fig. 14 (Sheet 5) is a plan view of the presser-foot and neighboring parts of the mechanism; Fig. 15 (Sheet 5) is a perspective view of part of the machine, at the end of and above the work-arm, illustrating particularly the operation of trimming the edges to be joined by the seam; Fig. 16 (Sheet 3) is an enlarged perspective view of the feed-arm; Figs. 17, 18 and 19 illustrate the stitch-forming elements in their relative positions when the needles are at the limit of their upward movement, and the loopers below the throat-plate at the limit of their advance or forward movement in relation to the needles, Fig. 19 being a vertical sectional view through the throat-plate and the work, with the stitch-forming elements above and below the work-plate in elevation, Fig. 17 being a corresponding plan view (turned at right-angles to Fig. 19) of the elements above the throat-plate, and Fig. 18 being a corresponding plan view (turned at right-angles to Fig. 19) of the elements below the throat-plate; Fig. 20 is a vertical section through the right-hand end of the machine; Fig. 21 (Sheet 5) is a vertical sectional detail on line J—K, Fig. 14; Fig. 22 (Sheet 7) is a detail of part of one of the tension devices; and Fig. 23 is a detail of the throat-plate.

The machine herein illustrated and described is adapted to form, by a single operation, the seam constituting the subject-matter of my United States Letters-Patent, No. 883,614, dated March 31, 1908; said seam is also illustrated and described in my above-mentioned patent application, Sr. No. 347,649, filed Dec. 13, 1906.

*Stitch-forming elements.*—A brief explanation of the movements of the parts which carry and act directly upon the nine threads—four needle-threads 1, 2, 3, and 4, cross-thread 5 and four hook or looper threads 6, 7, 8 and 9—will assist to an understanding of the driving connections and other mechanism by which said parts are actuated. Referring for this purpose to Figs. 17, 18 and 19, $1^a$, $2^a$, $3^a$ and $4^a$ are a gang of four parallel needles for the needle-threads 1, 2, 3 and 4 respectively; these needles are secured to a common needle-bar and reciprocate together, the needle $1^a$ being slightly shorter than the others, as shown, and for reasons which need not be herein detailed. In addition to the four needles, the thread-carrier 80 and the hook 101 for the upper cross-thread operate above the throat-plate. The thread-carrier 80 is fixed to the lower end of an oscillatory shaft 78, and has a thread-eye $5^a$ and a projecting thread-guiding blade $5^b$. Hook 101, also fixed to the lower end of an oscillatory shaft (referred to later), is formed at its end with a depending horn $5^c$. It will thus be seen that thread-carrier 80 and hook 101 oscillate with their respective shafts; at the stage of the stitch-forming operation shown in Figs. 17–19, the direction of their movement is indicated by arrows. A part of the presser-foot is shown at 26, and a part of an auxiliary foot, yieldingly carried by the presser-foot and designated a "chaining-foot," is shown at 25.

28 is the cloth or throat-plate and 30 is a piece of fabric on which the mechanism is operating. Of the elements operating below the throat-plate, 20 is a portion of the feed-surface operating upward through the throat-plate to advance the work, the path of its movement being illustrated by the ellipse 166 in dotted lines, Fig. 19.

$6^a$ $7^a$ $8^a$ and $9^a$ are loopers secured together and moving in unison in an approximately horizontal plane. The dotted line ellipse 199, Fig. 18, illustrates the path described by the looper $6^a$ in its movement. 14 is an oscillatory loop-spreader having thread engaging hook-points or teeth $6^b$, $7^b$, $9^b$.

15 is a loop-shedder acting to prevent movement of the loops in the needle-threads as the loopers are withdrawn from said loops.

27 is a loop-check and needle-guide the functions of which need not be here explained in detail.

The stitch-forming elements referred to above, when actuated through driving connections to be explained hereafter, coöperate to form a seam such as heretofore referred to.

*Work-arm and frame of machine.*—The frame-work of the machine comprises a main standard 40 of the hollow-column or box type, a standard 41 of the ribbed column type, a bridge 42 rigidly connecting the standards, and a work-arm $40^b$. Bridge 42 is arched on its under edge (Figs. 1 and 2) and has a sectional form similar to that of channel-iron, the web being vertical with the edge flanges projecting rearward. The moving parts requiring lubricant are as far as practicable inclosed or covered by hollow portions of the frame-work so formed that the lubricant or oil is prevented from flowing or leaking to the outer surfaces, but is drained into reservoirs from which it may be readily removed at convenient intervals. Removable caps are provided where access to working parts is necessary for adjustment or repairs. Thus, cap $40^a$ (Fig. 1) forms a part of the front and top of standard 40; cap $41^a$ (same views) covers parts working in the top of standard 41; and cap $41^b$ (Fig. 1, removed in Fig. 6) covers an eccentric and its connections at the left-hand end of machine. The hollow horizontal work-arm $40^b$ extends forward from an opening (Fig. 3) in the lower part of the front face of the standard 40, to an elbow from which the arm continues toward the left and rearward, its end terminating beneath an overhanging portion of the head of the machine, as shown in Fig. 1. Four screws 340 (see Figs. 2 and 20) pass through horizontal openings in the wall of standard 40, and their threaded ends take into threaded sockets in the end of the work-arm, thereby rigidly securing the latter to the standard. The two parts of the arm form an angle of approximately ninety degrees at the elbow, and each part forms an angle of less than ninety degrees with reference to the main portion of the frame-work. This outwardly bowed or elbowed work-arm is trough-like in cross-section, giving access to the parts operating therein upon removal of a cover $40^c$ (Fig. 1), as shown in Figs. 3 and 4. In the operation of this machine the feed operates to advance the work toward or off the free end of the work-arm.

*Main driving connections.*—45 is the main-shaft; at its right-hand end it carries the hand-wheel 46, having the usual grooved driving pulley $46^a$ integral therewith, and fixed on the shaft by a set-screw $46^b$ (Fig. 20). The hub of this combined wheel and pulley takes the end thrust of the shaft 45 against the end of bearing 48 in standard 40, and an oil flange 47 at the end of the hub sheds superfluous oil into the end of the bearing opening from which a groove 49 in the bearing conducts the oil through an opening $49^a$, to the inside of standard 40 which constitutes one of the reservoirs in which superfluous lubricant may accumulate. Shaft 45 extends in front of bridge 42 (Fig. 1) and through standard 41, carrying at its projecting end an eccentric 60, referred to hereafter.

50 is a bevel gear secured to shaft 45 by set-screw $50^a$ (Fig. 20), and meshing with a bevel gear 52 secured to vertical shaft 53 by set-screw 52ª. Ball-thrust bearing 51 surrounds shaft 45 between gear 52 and bearing 48.

118 is a combined bevel-gear and looper-eccentric secured by set-screw 118ª to the lower end of shaft 53. The eccentric portion is numbered 167. Gears 52 and 118 are thus so placed that the end thrust on each will be balanced by the other, thus avoiding friction and the necessity of ball-thrust bearings or like anti-friction devices. The bearings for shaft 53 are plain bushings 120, 120, encircled and clamped by lugs or bracket arms 121, 121 split at their outer ends and adapted to be tightened against the bearings by screws 122, 122. Through connections explained hereafter, shaft 53 drives all of the moving parts operating below the throat-plate.

As shown in Fig. 6, main-shaft 45 has thereon cross-thread-carrier eccentric 57 secured by set screw 57ª (Fig. 5), needle-bar eccentric 58 secured by set screw, not shown, and a trimmer and cross-thread-hook eccentric 60 secured by set-screw, not shown, the names of these eccentrics indicating the parts which they operate through connections referred to hereafter, all of said parts operating above the throat-plate.

*Needle-bar and needles.*—Referring particularly to Figs. 1 and 5, 72 is the needle-bar movable vertically in bushing-bearings 73 and 74 secured in arms of the machine-frame. A short pitman 61 has at opposite ends capped bearings, one embracing eccentric 58 and the other embracing a pivot-stud 63, which latter is clamped in a split opening in a rock-arm 62, a screw 64 serving to contract said opening to grip the stud. At one end a screw 66 secures the rock-arm to a short shaft 65 (Figs. 5 and 6) free to rotate in bearings 67 and 68 in the frame. A link 69 connects the other end of arm 62 with the needle-bar. A pivot-stud 71 (Figs. 1 and 6) screwed into a threaded opening through needle-bar 72, is embraced by the tubular cross-bar 69ᵇ at the lower end of link 69. From these explanations it will be apparent that eccentric 58 acts to vertically reciprocate the needle-bar.

At its lower end the needle-bar 72 carries a needle clamp in which the needles 1ª, 2ª, 3ª and 4ª are secured (Figs. 1, 5 and 15). A flange 72ª on this clamp has four thread-eyes through which the needle-threads pass to the eyes of the needles.

As clearly shown in Fig. 17, the eyes of the four needles are disposed on a bias, or in other words, slightly oblique to the line of feed; this is important as it enables the loops of needle-threads to open wide without interference with an adjacent needle, and consequently makes it possible to place the needles very close together without impairing the functioning of the loopers in engaging the needle-thread loops.

In a machine which has been successfully operated, the needles have been placed approximately one-sixteenth (1/16″) of an inch apart at their points, the other elements being positioned and proportioned accordingly.

*Cross-thread carrier.*—As already stated, cross-thread carrier 80 is fixed to the lower end of an oscillatory shaft 78. This shaft passes upward through a bearing-bushing 79 (Fig. 5) and above the latter carries a cylindrical head 78ª secured by set-screw 78ᵇ. A coiled spring 80ª (Fig. 5) housed in the lower end of bushing 79, bears against a shoulder on shaft 78 and normally holds said shaft (and consequently the thread-carrier 80) in its lowermost position with the overhanging edge of head 78ª in contact with the upper end of bushing 79.

77 is a short crank-arm projecting from one side of head 78ª, and 77ª is a lip or flange (the function of which will be explained later) extending about half-way around said head at its other side.

76 is a spherical bearing, formed on a stud which is screwed into crank-arm 77, and engaged by the spherical opening of a bushing 75 (Figs. 5 and 6) which latter is clamped in a split opening in one end of a pitman 74, by tightening screw 74ª. At its other end said pitman has a capped bearing surrounding the spherical bearing surface of eccentric 57. Through the connections thus described, this eccentric imparts to the thread-carrier 80, the swinging oscillatory movements heretofore explained.

*Cross-thread hook 101.*—Hook 101 is secured to the lower end of a short vertical oscillatory shaft 99, journaled in a tubular bearing 100, which latter is cast integral with a plate 100ª (Figs. 1, 15, 21) which is secured by screws to a flattened surface on a lower arm 100ᵇ of the standard 41 of the frame.

98 is a short crank-arm secured by a set-screw to the upper end of shaft 99. Spring 102 (Fig. 21, Sheet 5) housed in the lower end of bearing 100 holds the shaft 99 and hook 101 normally lowered with crank-arm 98 in contact with the upper end of the bearing.

84 is the trimmer-sleeve oscillatory about the hollow presser-foot bar 85 which passes therethrough (Figs. 1, 14 and 15).

84ª is a crank-arm projecting from sleeve 84 (Figs. 1, 6, 14) and connected to crank-arm 98 by a link 96; screw-studs 95 and 97 pivot the link to the respective arms.

84ᵇ (Figs. 1, 6) is a crank-arm extending from the upper end of sleeve 84. A ball-stud 83 screwed into the outer end of arm 84ᵇ is engaged by a bushing 82 clamped in a split opening in the outer end of a pitman 81 by tightening a screw 81ᵃ (Fig. 6). At its other end said pitman has a capped bearing surrounding the eccentric 60, which through the connections just explained imparts to the hook 101 the swinging oscillatory movement heretofore described.

*Trimmer.*—The machine comprises trimmer mechanism acting to trim two edges of fabric to be joined as the work is advanced to the needles. This trimmer consists of a fixed blade 90, and a reciprocatory blade 87. Blade 90, which is fixed to the presser-foot 26, has beveled edges, one engaging the undercut edge of a groove across the under face of the foot (Figs. 9, 14, 15), and the other beveled edge engaged by the beveled edge of a clamp block 91 secured by a screw 92. A yoke 86 secured to the lower end of an arm 84ᶜ forms an opening in which blade 87 is clamped by a set-screw 88 and shoe 89. Arm 84ᶜ is preferably cast integral with trimmer-sleeve or hollow trimmer shaft 84 and extends downward and around to one side of the presser-foot, as clearly shown in Figs. 1, 5, 6, 7, 14 and 15. It will therefore be understood that the oscillation of sleeve 84 from eccentric 60, heretofore referred to in connection with the hook 101, also reciprocates blade 87 through arm 84ᶜ. The edges of blades 87 and 90 are oppositely beveled and sharpened as shown at 93, Fig. 8, and act as shears when the cutting edge of reciprocating blade 87 moves toward and over the cutting edge of fixed blade 90, thereby cutting straight and clean the upturned edges of the fabric which the feed of the machine intermittently draws in between the blades. The strips or bits of material removed by the trimmer-blades are directed to one side and out of the way by a deflector 111 referred to hereafter. After leaving the trimmer, and before they reach the needles, the trimmed edges are laid flat and into abutment with each other, as explained hereafter.

*Presser-foot and chaining foot.*—85 is a hollow presser-foot bar, parallel to the needle-bar and behind the same when looking in the direction of feed. It is vertically movable in bearings through arms 103ᵇ and 100ᵇ respectively, on the standard 41 of the machine (see Figs. 1, 6, 14, 15). A screw-threaded opening tapped into arm 103ᵇ contains a spring 405 bearing against the upper end of the foot-bar and held under tension by a hollow adjusting nut 104 (dotted lines Fig. 1). In the operation of the machine this spring yieldingly presses the foot against the work, permitting the foot to be slightly raised upon each upward and forward movement of the feed surface in advancing the work.

26 is the presser-foot having a hub 216 (Fig. 9) through which foot-bar 85 passes. A set-screw 26ᵃ (Figs. 8 and 9) secures the foot to the bar. The presser-foot extends forward of its hub and downward toward the work-plate, and has a side strengthening web or rib 26ᵈ (Fig. 9) into which a headed stud 304 is screwed. Said stud passes loosely through and is movable in a vertical slot 305 in the fixed plate 100ᵃ thereby guiding and holding the foot in its vertical movement when lifted to introduce work, and when lifted by upward movements of the feed surface. At its forward end the presser foot is notched or bifurcated forming two toes 26ᵇ and 26ᶜ (Fig. 6) separated by a space in which the upturned edges of work to be trimmed advance to the trimmer blades which latter overlie or project into said space (see Figs. 6, 8 and 15). Trimmer blade 90 is secured in a groove in the underside of toe 26ᶜ, as already explained. Reciprocatory blade 87 works in a horizontal opening through toe 26ᵇ.

111 is a work-guide and deflector, which serves to direct and position the work as it approaches the trimmer blades, and by an extension 112 which reaches obliquely to the left (Fig. 15) over the toe 26ᶜ, deflects and discharges the trimmings, keeping them from being caught by the working parts about the needles. Guide 111 is secured to the vertical part of an angle-piece 113, the horizontal part of which movably fits in a transverse recess across the top of toe 26ᵇ. A screw-stud 114 (Fig. 11, Sheet 4) passes through an opening in the end of a lever 115 (Fig. 12) through a slot (dotted lines Fig. 8) in angle-piece 113, and into a screw-threaded opening in toe 26ᵇ. A pin 116 projecting from the underside of lever 115 is movable in a short slot 117 in angle-piece 113. It follows when the screw-stud 114 is loosened the lever 115 may be turned about said stud to slide the angle-piece in its recess in toe 26ᵇ thereby adjusting the work-guide to the right or left. When the desired position of adjustment is reached, the screw-stud 114 is tightened to rigidly fix the parts. A tapering notch 94 (see Figs. 8 and 9) on the under surface of the presser-foot immediately behind the trimmer blades, acts upon the upturned trimmed edges of the work to lay them flat into abutment just in advance of the needles.

The chaining-foot or auxiliary presser-foot 25 is shown by itself in Fig. 10, Sheet 4; in its relation to the other elements it is best shown in Figs. 8, 9 and 19. This foot 25 fits and is vertically movable in a correspondingly shaped opening through presser-foot 26, a notch or recess 25ᵃ providing an opening through which the four needles pass in entering the work and through which the cross-thread 5 is looped back and forth across the seam. The vertical shank 25ᵇ of the chaining-foot has beveled edges and is movable in a dove-tailed guide-way or groove 25ᶜ (Fig. 8) in what may be called the shank or stem of the main presser-foot, said movement being limited by a stud 109 working in a slot 110 (Fig. 9). A spring 107, housed in an opening in the presser-foot, bearing at its lower end against the upper end of shank 25ᵇ and at its upper end against screw-plug 108, tends to move the chaining-foot to its lowermost position determined by pin 109 and slot 110. The chaining-foot is wide enough to cover the four lines of stitches with which latter it makes contact. The presence of the threads forming the stitches adds thickness to the work along the line of the seam, this added thickness varying slightly with the different sizes of thread. By its yielding connection to the main presser-foot, the chaining-foot automatically accommodates itself to the difference of thickness without lifting the main presser-foot from contact with the work in front of the needles or at the sides of the seam, shown, for example, in Fig. 19. This results in distributing and equalizing the grip upon the work in feeding the same all about the point of operation of the needles, so that the feeding pull tends to advance the work uniformly and in a straight line at and about the point of formation of the stitches.

The satisfactory operation of a machine of this type requires that it shall be capable of "chaining-off", i. e., of forming the threads into stitches when there is no fabric under the presser-foot, as in passing the seam from one garment to another without stopping the machine or lifting the presser-foot. In the absence of any fabric, the feed-surface in making the feeding part of its movement makes direct contact with the under surface of presser-foot 26, while it grips the chain by pressing the latter against chaining-foot 25. When the next garment, for example, enters beneath the forward end of the presser-foot, the upward movement of the feed-surface lifts said foot higher than when no fabric is interposed between these parts. If the presser-foot and chaining-foot were rigidly fastened together (or in other words, if there was no chaining-foot), the latter foot would also be correspondingly lifted at this time, and so elevated that the feed-surface could not properly grip and feed the chain. This feed being essential, imperfect formation of stitches would be almost inevitable, and imperfectly formed stitches would likely appear at the beginning of the seam on the new garment. The mechanism might even become so clogged with thread as to require stopping of the machine. Such difficulties are, however, overcome by the yielding connection between the two feet, enabling the chaining-foot to remain in its lowered position in which it coöperates with the feed-surface to continue the feed of the chain while the next garment is entering beneath the presser-foot 26.

The means for lifting the presser-foot will be explained hereafter.

*Thread-guides, tensions, take-ups, etc. above throat plate.*—Similar tension devices are used for the four needle-threads and the four looper-threads (see Figs. 1, 2, 20). Referring particularly to Fig. 20, 138 is a bracket secured to the upper surface of the bridge 42 of the machine. 139 is a bar supported and longitudinally movable in a bearing opening through said bracket. A relatively strong spring 147 encircling bar 139, between bracket 138 and a washer 148, held by a pin 149, exerts yielding pressure tending to move bar 139 to the left. A pin 146 (Fig. 20) passing through bar 139 lies in a slot across the right hand face of bracket 138, and prevents rotation of the bar 139. A series of eight tension disks 145 are strung on bar 139, and pressed together by the action of a spring 143, which latter encircles the bar between washers 144 and 144ᵃ and is somewhat weaker than spring 147. The right-hand end of bar 139 is screw-threaded and split (Figs. 20 and 22) and is engaged by an elongated thumb-nut 140 the inner end of which bears against washer 144ᵃ. The end of bar 139, at one side of the split, is cut away or shortened, as shown in Fig. 22, and at the other side forms radiating stop-surfaces 142, 142. A pin 141 projecting into the opening through nut 140, limits the turning of the latter by engaging one or the other of the stop surfaces 142, thereby varying the compression of spring 143 and consequently the pressure of the tension disks against each other and the strength of the tension upon the threads. In engaging the screw-threaded end of bar 139, nut 140 tends to compress together the parts separated by the slit; the resulting friction prevents accidental turning of the nut.

138ᵃ and 138ᵇ (Fig. 1) are two arms on bracket 138; the former has four thread-eyes for the looper threads 6, 7, 8 and 9 respectively, while arm 138ᵇ has but one eye through which all the threads pass. Thread 6, for example, passes through its eye in arm 138ᵃ, around bar 139 between the convex surfaces of the two left-hand disks 145, through said eye in the opposite direction and then through eye 138ᵇ to the take-up 54, explained hereafter. The other threads 7, 8 and 9 follow similar paths between other disks 145. Or if it is found desirable to slightly increase the tension of any or all of the threads, they may in passing from the eyes in arm 138ᵃ to the eye in arm 138ᵇ, pass through the slots in arm 215 (Figs. 1 and 20). A similar arm 215ᶜ is better shown in Fig. 6. The bend thus formed in the threads and the resulting friction, increase the tension.

The construction of the tension device for needle-threads 1, 2, 3 and 4 is the same as described above except that bracket 137 is left-hand whereas 138 is right-hand. The needle-threads loop through the eyes in arm 137ª around rod 139ª and between the tension disks, and from an eye in arm 137ᵇ pass to a take-up 56. The arm 215ᶜ (Fig. 6) has slots through which the threads may pass to increase the tension in the manner explained as to similar arm 215.

The tension device for cross-thread 5 is similar in construction to the other tension devices except that the bracket 210 has only one arm 210ª (Fig. 1) and there are only two tension disks 152 (Fig. 6) on bar 150ª. Thread 5 loops through an eye in arm 210ª around bar 150ª between the disks, and thence extends to take-up 55.

The take-ups 54, 55 and 56 (Figs. 1, 2, 6 and 20) are similar in construction and are all fixed on shaft 45. Take-up 54, for example (Fig. 20), consists of a disk or wheel, secured to shaft 45 by a set-screw 54ª and having a deep peripheral groove across which one or more pins 208 extend. From the take-ups the threads pass through guide-eyes 209, 210, and 211, secured to the bridge 42 of the frame below the take-ups 56, 57 and 54 respectively (Figs. 1 and 6). The pins of the take-ups are so located with relation to their centers of rotation and the movement of the other elements of the machine, that they act in a well-known manner to take up slack thread at proper periods in the stitch-forming operation.

In addition to the rotary take-up 56, there is provided, for the needle-threads 1, 2, 3 and 4, a reciprocating take-up 212 (see Figs. 1, 5 and 6). This take-up is in the form of a bent rod or wire, secured at its upper end to the needle-bar 72 by a screw 213 which latter engages a threaded opening in the end of stud 71 heretofore referred to (see Fig. 14). The lower end of the take-up is in the form of a hook which engages about the needle-threads between the eye 209 and the thread-eyes in the flange 214 of the needle-clamp. As the needle-bar ascends to its highest position, take-up 212 acts to deflect the threads, as shown in Fig. 1, thereby coöperating with take-up 56, in taking up slack thread from the needle-thread loops below the work.

*Presser-foot lifting and tension-releasing means.*—Referring particularly to Figs. 2, 5 and 7, 126 is a rock-shaft journaled at its ends in bearings in standards 40 and 41. 127 (Figs. 2 and 5) is a rock-arm secured to shaft 126 by a set-screw and projecting rearward and resting on the upper end of a vertically movable lifter rod 128, which latter extends downward through a bearing in the flanged base of standard 40, to a knee-lifter device or treadle (not shown) by which the operative may lift the rod 128 to rock shaft 126. An arm 129 (Figs. 2 and 5) set-screwed to the other end of shaft 126, is connected by link 130 to one arm of bell-crank-lever 131 fulcrumed on a stud 131ª, the other arm of said lever reaching forward and engaging under a shoulder 84ᵈ of trimmer arm 84ᶜ (Figs. 5 and 7). When the bell-crank-lever is actuated through these connections, it lifts the trimmer sleeve 84, which in turn acts through a spring washer 84ᵉ (Fig. 5) and a collar 84ᶠ set-screwed on presser-foot bar 85, to lift the latter and with it the presser-foot and parts mounted thereon, against the tension of presser-foot spring 405 (Fig. 1). A lip or flange 84ᵍ at the lower end of trimmer-sleeve 84 engages under a projecting lip 98ª on the hub of crank arm 98 (Figs. 6 and 14), and thereby lifts hook-shaft 99 vertically in its bearings against spring 102 (Fig. 21), thus elevating hook 101. An arm 84ʰ (Figs. 1 and 6) at the upper end of sleeve 84, engages under lip 77ª of the crank-arm 77, and thereby lifts shaft 78 and with it cross-thread carrier 80, against the tension of spring 80ª (Fig. 5). It will thus be seen that through connections from the trimmer sleeve 84, the lifting of the latter elevates the presser-foot against its spring 105, the cross-thread carrier 80 against its spring 80ª, and the cross-thread-hook 101 against its spring 102; and that when the operative releases the lifting means the tension of these springs will re-act to lower these parts at the same time rotating rock-shaft 126 to the position shown in Fig. 5.

When the operating parts above the throat-plate are lifted, as above explained, to permit removal of the work, where, for example, it is desired to terminate the seam back from the edge of the fabric or work, it is desirable to release the tensions to permit the threads to easily feed as the work is drawn out of the machine. This is accomplished by arms 150 and 151 secured on rock-shaft 126 (Figs. 1, 2, 6 and 7) and extending upward through openings in the upper flange of the channel-iron bridge 45. When the operative rocks shaft 126 to lift the presser-foot and other parts, the beveled end 150ª of arm 150 acts against the ends of bars 139ª and 150ª moving them longitudinally in their bearings against the tension of springs 147, and releasing the pressure between the tension disks and consequently their grip upon the threads 1, 2, 3, 4 and 5. In like manner the beveled end 151ª of arm 151 acts against the end of bar 139 moving the same in its bearing against the tension of spring 147 and releasing the tension upon threads 6, 7, 8 and 9.

*The feed, throat-plate, chaining fingers*

*and loop-shedder.*—123, Figs 3, 4 and 20, is the feed-shaft bearing in adjustably fixed bushings 154, 155. Bushing 154 receives the end thrust of bevel-gear 119 through the intermediate ball-thrust-bearing 156. Bevel-gear 119 is rotated by bevel-gear 118 with which it meshes, and a pin 124$^d$ on gear 119 engages a screw-stud 125 (Fig. 20) on feed-shaft 123 to rotate the latter. Another pin 124 projecting from gear 119 in the path of stud 125, limits the rotation of shaft 123 independent of gear 119 and consequently independent of the rotation of the main shaft 45. The object of this lost motion connection will be explained hereafter. Shaft 123 extends through bearing 155 and carries the eccentric 157 (Figs. 3 and 4), and the latter is embraced by a capped bearing 158 at the end of feed-lever or feed-bar 159. Lever 159 is hung at about its middle on a flat-spring fulcrum 160, one end of said spring being fastened to a lug 161 on the inner wall of work-arm 40$^b$ and the other end to a depending arm 162 on lever 159. The spring 160 allows the feed lever to swing forward and backward approximately on a radius equal to the length of the free spring. At its forward end the feed-lever is guided and confined at its sides by two parallel guide-bars 163, 163 secured by screws to the inside of the hollow work-arm; a recess or groove 164 (Figs. 3 and 4) extending longitudinally along this end of the feed-lever receives the foot 165 (Fig. 16) of the feed surface 20, a screw 165$^a$ passing through an elongated opening 165$^b$ securing the parts together and allowing limited adjustment. When in its elevated position the feed-surface extends forward and upward through the throat-plate 28 (see Figs. 4 and 19). The feed-surface proper is separated into five rows of teeth 20, 21, 22, 23 and 24, which work through slots 25$^a$, 21$^a$, 22$^a$, 23$^a$, 24$^a$, respectively, in the throat-plate 28 (Fig. 23) and leave an opening 20$^a$ (Fig. 16) through the feed-surface through which the needles operate. The rows of teeth 22 and 23 in front of the needles, and the rows of teeth 21 and 24 at the sides, press the work upward against the under surface of the presser-foot 26 in gripping and feeding the same, while the teeth 20 just back of the needle-opening press the work up against the chaining-foot 25, or in the case of "chaining off" feed the chain by gripping it against said foot.

The circular movement of the feed eccentric 157, is by virtue of the swinging spring fulcrum of the feed-lever 159 transformed into an elliptical motion in the toothed feed-surface, the major axis of the ellipse (see 166, Fig. 19) being vertical or slightly pitched in the direction of feed, or in a direction opposite thereto, as desired. This throws the greater portion of the forward movement of the feed surface teeth above the work-plate, at which time they act to feed the work, the needles being elevated clear of the work (see Fig. 19). As will be understood, these movements of the feed-surface cause it to operate upon what is known in this art as the four-motion principle.

From an examination of Fig. 19, it will be understood that when the needles are elevated free of the work, the teeth of the feed-surface, in the normal operation of the machine, project above the surface of the throat-plate. In order that the teeth of the feed-surface may not interfere with removal of the work (particularly when the seam is stopped back from the edge of the work) when the needles are up and the presser-foot lifted, means are provided whereby the feed surface will be dropped below the surface of the throat-plate under these conditions. As will be seen this dropping of the feed-surface takes place simultaneously with the lifting of the presser-foot and release of the tensions. The outer end of lever-arm 127 on rock-shaft 126 (Figs. 2 and 3) is connected by a depending link 132, to a rock-arm 133 pivoted on a stud 134. Teeth 135 at the end of arm 133 are adapted to engage gear teeth on a sleeve 136 secured to the projecting end of feed-shaft 123. In operation, when the machine is stopped with the needles up, and the operative lifts the presser-foot and releases the tensions, as already explained, the lifting of arm 127 will swing the arm 133 upward and its teeth 135 will engage the teeth of 136 (which are so located as to come to position to be thus engaged when the machine is stopped with the needles up) and slightly rotate the feed shaft 123 in the direction of the arrow Fig. 20, until the teeth 135 pass the teeth of 136, the stud 125 leaving its driving pin 124$^d$ on gear 119, as shown in Fig. 20. This limited independent rotation of the feed-shaft causes its eccentric 157 to rock feed lever 159 sufficient to drop the feed surface below the surface of the throat-plate. When the machine is again started, the feed shaft and feed remain stationary until pin 124$^d$ again overtakes stud 125, from which it results that the normal positioning and timing is not affected by this temporary lowering of the feed while the needles are up.

The throat-plate 28 fits in a flanged opening in upper surface of the outer end of the work-arm and is secured by a screw 28$^a$ (Fig. 4). Teeth 28$^b$ cut across the upper face of the throat-plate, extend from its forward end, in front of the needles, along the parts of the plate separated by the slots 21$^a$ to 25$^a$ beneath the presser foot (Fig. 23). The foot presses the work against these teeth when the feed-surface teeth are beneath the throat-plate, and thus securely holds the work against any backward pull by the operator in arranging the work and guiding it to the trimmer.

16ª (Figs. 19 and 23) is a chaining finger plate secured to the throat-plate across the front of the needle opening 19 through the latter. Three chaining fingers 16, 17 and 18 project forward from this plate and divide one end of the needle opening 19 into four spaces or parts into which the needles descend at the sides of the fingers. The principal function of these chaining fingers is to take the place of the work or fabric, enabling the machine to properly form the stitches when running without any work under the needles in the operation of chaining off. The stitches are formed about the fingers and advanced off of the free ends thereof by the feed of the chain. At the same time the presence of these fingers in no way interferes with the proper formation of stitches when work is under the needles, as illustrated in Fig. 19. In both cases the threads cross, on both sides of the seam, back and forth across the chaining-fingers in practically the same way, the only difference being that in "chaining off", the cross-thread 5 on the needle-side of the work bears directly upon the chaining-fingers instead of upon interposed fabric. Hence the threads may be accurately said to be passed across the chaining fingers whether or not fabric or work is interposed.

15 is a loop shedder (Figs. 4 and 19) in the form of a depending flange or lip secured to the under side of throat-plate 28 across the rear edge of the needle-opening. As shown, this shedder depends into the needle-opening 20ª of the feed-surface to the rear of the path of the needles, and between the side bars on which the rows of feed surface teeth 21 and 24 are formed. As previously explained, the function of the loop-shedder is to prevent movement of the loops in the needle-threads as the loopers are withdrawn from said loops.

*Loop-spreader.*—Loop-spreader 14, heretofore referred to and shown in Figs. 3, 18 and 19, is in the shape of a bell-crank-lever, pivoted at one end on a pin 202 which latter is secured to hollow work-arm by a screw 203 (Fig. 3). A stud 205 depending from the underside of the loop-spreader at the angle or bend thereof is so connected with the end of the feed-lever 159 that the movements of the latter oscillate the spreader on its pivot pin 202, thus swinging the toothed end of the spreader back and forth transversely to the work-arm.

*Loopers and operating means therefor.*—Referring particularly to Figs. 3 and 4, 177 is the looper-lever.

183 is a looper carrier or block swiveled to turn on a headed stud 184, which after passing through the carrier enters a socket in the end of lever 177 where it is secured by screw 185. The four loopers 6ª, 7ª, 8ª and 9ª are secured together on the carrier 183. As shown in Figs. 18 and 19, each looper has a thread groove 196 extending along one side from its rear end to a thread-eye 197, and a short groove 196ª along its other side from eye 197 to a second thread-eye 198.

The loopers are actuated from the looper-eccentric 167 (Figs. 3, 20) heretofore mentioned through the pitman 169 and looper-lever 177. Said eccentric is embraced by the capped end 168 of pitman 169. About midway of its length, pitman 169 slidingly bears against a flattened seat 170ª (Figs. 3, 4) in the work-arm. Above this seat an oblong opening in the pitman is closed at one side by a cap 169ª; the length of the slot permits the pitman to move longitudinally on bearing blocks 171, 171 in said opening, said blocks embracing and being movable about a headed pivot-stud 170 secured at its lower end in a socket in seat 170ª. A washer 173 on the stud 170 beneath the head thereof, extends over the bearing blocks and over the upper surface of the pitman at the sides of the rectangular opening therein, and confines the parts in operative position. Through these connections the eccentric moves the pitman longitudinally, and at the same time rocks it about the fixed pivot stud 170. A headed pivot pin 176 is secured to the forward end of pitman 169, in the elbow of the work-arm, by a screw 175, passing through a cap 174 and the end of said pin. The headed end of this pin is embraced by the capped end 178 of the looper-lever 177. A flattened under-surface on lever 177 bears and is slidable against a flattened horizontal seat or surface 177ª at the bottom of the work-arm (Fig. 4).

181 is a headed pivot-stud fixed at its lower end in a socket through seat 177ª by a screw 181ª (Fig. 4), and embraced by a split bearing 180, consisting of two blocks. An elongated rectangular opening through the looper-lever above seat 177ª embraces the bearing 180 beneath the head of pivot stud 181. From these connections it follows that the looper lever 177 may move longitudinally on and at the same time turn about pivot-stud 181 as a fulcrum, this combined movement being imparted to said lever from the pitman 169 through the connections explained, and resulting at the loopers in the elliptical movement indicated at 199 in Fig. 18.

*Passage of looper-threads to the loopers.*—The path of these threads 6, 7, 8 and 9 has heretofore been traced to the thread-eye 209 (Fig. 1); from the latter they descend to four thread-eyes 216 (Fig. 3) in a bar across the inside of a thread-guard 217, whence they pass horizontally along the inside of the guard to four more thread-eyes 219, and from the latter through four grooves or channels in the upper surface of a bar 220 which bridges the hollow work-arm in a diagonal direction directly beneath the work-arm cover 40ᶜ (Fig. 1) which is removed in Figs 3 and 4. From the ends of the grooves the threads pass through suitable eyes (not shown) on the front vertical wall of the work-arm along a recess or channel 221ᵃ (Fig. 3) in said wall beneath cover 223 (Fig. 1), between separating and guiding pins 222, arranged in a vertical row (only the top pin showing in Fig. 3) and through opening 190 (Fig. 3) to the thread-eyes 195 (Figs. 4 and 19) from which they pass to the loopers, as shown.

230, Figs. 1, 14 and 15, is a thread cutter for severing the threads connected to the upper side of the work. Referring to Figs. 1 and 2, 235 is the operating handle of a second thread cutter adapted to sever the threads connected to the lower side of the work. As these thread-cutters form no part of the subject-matter of the invention covered herein, further explanation thereof is unnecessary.

What I claim is:

1. The combination with a main presser-foot, of a needle or needles operable through an opening in said main-foot in forming the seam; means for looping a cross-thread back and forth into said opening in the main-foot through which the needle or needles operate and into engagement with the stitches formed by said needle or needles; an auxiliary presser-foot located to bear upon the work in the rear of the needle or needles; and means acting to yieldingly press said auxiliary-foot against the work independent of movement of the main-foot.

2. The combination with a main presser-foot, of a needle or needles operable through an opening in said main-foot in forming the seam; means for looping a cross-thread back and forth into said opening i the main-foot through which the needle or needles operate and into engagement with the stitches formed by said needle or needles; an auxiliary presser-foot movable in an opening or recess in the main-foot and located to bear upon the work in the rear of the needle or needles; and means tending to yieldingly move the auxiliary-foot toward the work in its opening in the main-foot.

3. The combination with a main presser-foot, of a needle or needles operable through an opening in said main-foot in forming the seam; means for looping a cross-thread back and forth into said opening in the main-foot through which the needle or needles operate and into engagement with the stitches formed by said needle or needles; an auxiliary presser-foot movable in an opening or recess in the main-foot and located to bear upon the work in the rear of the needle or needles; and a spring acting between the main and auxiliary feet and tending to yieldingly move the auxiliary-foot toward the work in its opening in said main-foot.

4. The combination with a main presser-foot, of a plurality of needles operable through an opening in said main-foot in forming the seam; a cross-thread-carrier and a cross-thread-hook coöperating with the needles to loop a cross-thread back and forth into said opening in the main-foot through which the needles operate and into engagement with stitches formed by said needles; an auxiliary presser-foot movable in an opening or recess in the main-foot and located to bear upon the work in the rear of the needles; and means tending to yieldingly move the auxiliary-foot toward the work in its opening in the main-foot.

5. In a sewing machine, the combination with stitch-forming mechanism, of a throat-plate; a presser-foot; trimmer mechanism associated with the presser-foot; means for looping a cross-thread back and forth across the seam into engagement with stitches formed by the stitch-forming mechanism; and means under control of an operative for moving said presser-foot and associated trimmer-mechanism and the cross-thread looping-means from their normal operative positions to positions more distant from the throat-plate to permit introduction and withdrawal of work.

6. In a sewing machine, the combination with stitch-forming mechanism, of a throat-plate; means for looping a cross-thread back and forth across the seam into engagement with stitches formed by the stitch-forming mechanism; a thread-tension device for tensioning said cross-thread; and means under control of an operative for moving said cross-thread looping means from its normal operative position to a position more distant from the throat-plate and simultaneously releasing the tensioning action of the tension-device upon the cross-thread.

7. In a sewing machine, the combination of a throat-plate; a presser-foot bar longitudinally movable in bearings at the head of the machine toward and from the throat-plate; a presser-foot carried by said bar; a tubular shaft or sleeve surrounding said presser-bar and movable thereabout; and means under control of the operative for moving said hollow-shaft longitudinally and through said shaft longitudinally moving the presser-foot-bar and the presser-foot thereon away from the throat-plate for insertion or withdrawal of work.

8. The combination of a throat-plate; a sleeve or hollow shaft rotatable to actuate one of a number of coöperating seam-forming elements and longitudinally movable toward and from the throat-plate; a bar about which said hollow shaft is rotatable; a second shaft longitudinally movable toward and from the throat-plate and rotatable in bearings; a thread-handling element carried by said second shaft; independent driving connections for rotating said hollow shaft and said second shaft; and means under control of the operative for longitudinally moving said hollow shaft and said second shaft away from the throat-plate for insertion or withdrawal of work.

9. The combination of a throat-plate; a sleeve or hollow shaft rotatable to actuate one of a number of coöperating seam-forming elements and longitudinally movable toward and from the throat-plate; a bar about which said hollow shaft is rotatable; a second shaft longitudinally movable toward and from the throat-plate and rotatable in bearings; a thread-handling element carried by said second shaft; independent driving connections for rotating said hollow shaft and said second shaft; means under control of the operative for longitudinally moving said hollow shaft away from the throat-plate; and a connection from said hollow shaft to the second shaft for imparting to the latter said longitudinal movement of the former away from the throat-plate.

10. The combination of a throat-plate; a rotatable sleeve or hollow shaft longitudinally movable toward and from the throat-plate; a bar about which said hollow shaft is rotatable; a second shaft longitudinally movable toward and from the throat-plate and rotatable in bearings; a thread-handling element carried by said second shaft; a third shaft longitudinally movable toward and from the throat-plate in bearings; a second thread-handling element carried by said third shaft; connections from the hollow shaft to said third shaft imparting to the latter longitudinal and rotary movements of the former; independent driving connections for rotating said hollow shaft and said second shaft; and means under control of the operative for longitudinally moving said hollow shaft and said second shaft away from the throat-plate for insertion or withdrawal of work.

11. The combination of a throat-plate; a rotatable sleeve or hollow shaft longitudinally movable toward and from the throat-plate; a bar about which said hollow shaft is rotatable; a second shaft longitudinally movable toward and from the throat-plate and rotatable in bearings; a thread-handling element carried by said second shaft; a third shaft longitudinally movable toward and from the throat-plate in bearings; a second thread-handling element carried by said third shaft; connections from the hollow shaft to said third shaft imparting to the latter longitudinal and rotary movements of the former; independent driving connections for rotating said hollow shaft and said second shaft; means under control of the operative for longitudinally moving said hollow shaft away from the throat-plate; and a connection from said hollow shaft to the second shaft for imparting to the latter said longitudinal movement of the former away from the throat-plate.

12. The combination of a throat-plate; a rotatable sleeve or hollow shaft longitudinally movable toward and from the throat-plate; a bar about which said hollow shaft is rotatable; trimmer-mechanism; an arm extending from the hollow shaft and connected to a movable blade of the trimmer-mechanism; a second shaft longitudinally movable toward and from the throat-plate and rotatable in bearings on the machine-frame; a thread-handling element carried by said second shaft; independent driving connections for rotating said hollow shaft and said second shaft; and means under control of the operative for longitudinally moving said hollow shaft and through it the trimmer-mechanism and said second shaft away from the throat-plate.

13. The combination of a throat-plate; a rotatable sleeve or hollow-shaft longitudinally movable toward and from the throat-plate; a bar about which said hollow shaft is rotatable; trimmer-mechanism; an arm extending from the hollow shaft and connected to a movable blade of the trimmer-mechanism; a second shaft longitudinally movable toward and from the throat-plate and rotatable in bearings on the machine-frame; a third shaft also longitudinally movable toward and from the throat-plate and rotatable in bearings on the machine-frame; a thread-handling element carried by each of said second and third shafts; driving connections for imparting rotary movement to said hollow shaft, the second shaft and the third shaft; and means under control of an operative for longitudinally moving said hollow-shaft, the trimmer-mechanism and the second and third shafts away from the throat-plate.

14. The combination of a throat-plate; a rotatable sleeve or tubular-shaft longitudinally movable toward and from the throat-plate; a bar about which said tubular shaft is rotatable; a second and a third shaft each longitudinally movable toward and from the throat-plate and rotatable in bearings; a thread-handling element carried by each of said second and third shafts; driving connections for imparting rotary movement to said tubular-shaft and the second and third shafts; and means under control of an operative for moving said tubular-shaft and said second and third shafts longitudinally away from the throat-plate.

15. The combination of a throat-plate; a rotatable sleeve or tubular-shaft longitudinally movable toward and from the throat-plate; a presser-foot bar about which said tubular shaft is rotatable; a presser-foot on said presser-foot bar; a second and a third shaft each also longitudinally movable toward and from the throat-plate and rotatable in bearings; a thread-handling element carried by each of said second and third shafts; driving connections for imparting rotary movement to said tubular shaft and said second and third shafts; and means under control of an operative for moving said tubular shaft and said second and third shafts and the presser-foot bar away from the throat-plate.

16. The combination of a throat-plate; a rotatable sleeve or tubular-shaft longitudinally movable toward and from the throat-plate; a presser-foot bar about which said tubular-shaft is rotatable; a presser-foot on said bar; trimmer-mechanism; an arm on the tubular-shaft connected to a movable blade of the trimmer-mechanism to actuate the same; a second and a third shaft each also longitudinally movable toward and from the throat-plate and rotatable in bearings; a thread-handling element carried by each of said second and third shafts; driving connections for imparting rotary movement to said tubular-shaft and said second and third shafts; and means under control of an operative for moving said tubular shaft, said second and third shafts, the presser-foot bar and the trimmer-mechanism away from the throat-plate.

17. The combination of a tubular-shaft; a throat-plate; a bar on which said shaft is longitudinally movable toward and from the throat-plate; a second and a third shaft also longitudinally movable toward and from the throat-plate; a cross-thread carrier and a cross-thread hook carried by said second and third shafts respectively; driving connections for imparting rotary movement to said hollow shaft and said second and third shafts the driving connections to one of the latter including the tubular-shaft; and means under control of an operative for longitudinally moving said tubular shaft, said second and third shafts and the cross-thread carrier and cross-thread hook thereon away from the throat-plate.

18. The combination of a rock-shaft journaled in the frame of the machine; a throat-plate; one or more thread-handling elements operating above and movable toward and from the throat-plate; connections from said rock-shaft to said thread-handling element or elements; and means under control of an operative for rotating said rock-shaft and through said connections thereby moving said thread-handling element or elements away from the throat-plate for insertion or withdrawal of work.

19. The combination of a rock-shaft journaled in the frame of the machine; a throat-plate; one or more thread-handling elements operating above and movable toward and from the throat-plate; connections from said rock-shaft to said thread-handling element or elements; and means under control of an operative for rotating said rock-shaft and through said connections thereby moving said thread-handling element or elements away from the throat-plate for insertion or withdrawal of work; one or more thread-tensioning devices; and means on said rock-shaft acting to release said tension device or devices simultaneously with the movement of the thread-handling element or elements away from the throat-plate.

20. The combination of a feed-surface; a main driving shaft; a feed-shaft driven from the main driving shaft to operate said feed-surface; and means for imparting limited driving movement to said feed-shaft and hence to the feed-surface independent of the main driving shaft.

21. The combination of a main driving shaft; a needle and connections for driving the same from said main-shaft; a feed-surface; a feed-shaft rotatively driven from the main-shaft to operate said feed-surface; and means for imparting limited rotary movement to said feed-shaft independent of the main shaft to move the feed-surface without moving the needle.

22. The combination of a throat-plate; a presser-foot and a four-motion feed-surface positioned and operating to engage opposite sides of the work respectively; driving connections for actuating the feed-surface; and means common to both the presser-foot and feed surface for moving the former away from the throat-plate and the latter through a portion of its regular feed movement out of position to engage the work.

23. The combination of a presser-foot; a four-motion feed-surface and driving connections for operating the same; and a device operable by the operative to lift the presser-foot and move the feed-surface through a portion of its regular feed movement to lower the same.

24. The combination of a presser-foot; a four-motion feed-surface and driving connections for operating the same; and a device operable by the operative to move both the presser-foot and feed-surface relatively away from each other, such movement of the feed-surface being through a portion of its regular feed-movement.

25. The combination of a presser-foot; a feed-surface; a feed-shaft and driving connections for operating the same; and a device under control of the operative to both lift the presser-foot and rotate the feed-shaft independent of its driving connections to lower the feed-surface.

26. The combination of a main driving-shaft; a feed-surface; a feed-shaft; lost-motion driving connections between the main and feed shafts; and means for rotating the feed-shaft independent of the main-shaft within the limits of the lost-motion afforded by said driving connections.

In testimony whereof I have signed this specification in the presence of two subscribing witnesses.

CHRISTINA P. BORTON,
*Administratrix of the estate of Stockton Borton, deceased.*

Witnesses:
  HERBERT E. MATHEWSON,
  JAMES C. COLLINS, Jr.